(12) United States Patent
Chang

(10) Patent No.: US 7,359,614 B2
(45) Date of Patent: Apr. 15, 2008

(54) BACKLIGHT MODULE

(75) Inventor: Ching-Lung Chang, Padeh (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 0 days.

(21) Appl. No.: 11/335,624

(22) Filed: Jan. 20, 2006

(65) Prior Publication Data

US 2007/0172193 A1    Jul. 26, 2007

(51) Int. Cl.
*G02B 6/10* (2006.01)
(52) U.S. Cl. .................................................. 385/146
(58) Field of Classification Search ............... None
See application file for complete search history.

(56) References Cited

U.S. PATENT DOCUMENTS

| | | | | |
|---|---|---|---|---|
| 5,727,862 A | * | 3/1998 | Wu | 362/27 |
| 5,729,310 A | * | 3/1998 | Horiuchi et al. | 349/62 |
| 5,966,191 A | * | 10/1999 | Lee | 349/58 |
| 6,055,029 A | * | 4/2000 | Kurihara et al. | 349/65 |
| 6,847,416 B2 | * | 1/2005 | Lee et al. | 349/58 |
| 2001/0050731 A1 | * | 12/2001 | An et al. | 349/58 |
| 2002/0008806 A1 | * | 1/2002 | Natsuyama | 349/62 |
| 2002/0060758 A1 | * | 5/2002 | Jeong et al. | 349/65 |
| 2005/0099555 A1 | | 5/2005 | Kim | |
| 2005/0259444 A1 | | 11/2005 | Choi | |

FOREIGN PATENT DOCUMENTS

CN    1595259    3/2005

\* cited by examiner

*Primary Examiner*—Michelle Connelly-Cushwa
*Assistant Examiner*—Mike Stahl
(74) *Attorney, Agent, or Firm*—Jianq Chyun IP Office

(57) ABSTRACT

A backlight module has a light guide plate and a frame, wherein the light guide plate includes at least a bump or at least a breach, and at least a pin is arranged on the frame, so as to the bump or the breach may be engaged with the pin. The pin on the frame not only fixes and positions the light guide plate but also prevents the light guide plate from leaking light and enhances the structure strength.

10 Claims, 4 Drawing Sheets

BACKLIGHT MODULE

BACKGROUND

1. Field of the Invention

The present invention generally relates to a backlight module, and more especially, to an orientation structure of light guide plate (LGP).

2. Description of the Prior Art

With the progress of science and technology, because the superiority of the liquid crystal display is light, thin, and low power consumption, the application of the liquid crystal display expands rapidly. Owing to the liquid crystal display is not a radiation device, the backlight module plays a great role in liquid crystal display. Wherein, generally speaking, the orientation of light guide plate can be achieved by utilizing the plastic frame or a plank which is backplate-stamping. The advantage of utilizing the plastic frame is the shape of the frame can be varied by mold. But the light guide plate must be assembled reversely if the plastic frame is used to position the light guide plate. The drawback of the type is it may cost a long time to fabricate and the accuracy of the assembly is low. Besides, refer to FIG. 1, FIG. 1 is a schematic top view of the architecture of the backlight module 100' in accordance with the prior art, stamping plank 410' punched from back plate 400' is utilized to position the light guide plate 300', the structure of the type is strong enough but the light easily leaked out from corner 330' of the protrusion 320' of the light guide plate 300'. A modified method is to make an arc between the light guide plate and protrusion. However, the contact area of the protrusion and back plate may be decreased when the radius of the arc increases, so as to the protrusion is easy to be broken. So it is an important issue to enlarge the size of the protrusion without changing the contact area between light guide plate and back plate and to prevent the light guide plate from leaking light.

Hence, the main spirit of the present invention is to provide a backlight module, and then some disadvantages of well-known technology are overcome.

SUMMARY OF THE INVENTION

In order to solve the problems mentioned above, the present invention provides an orientation structure of the light guide plate applied to backlight module.

The leaking light issue on the light guide plate is resolved by providing a blocker structure applied to backlight module. The pins on the back plate and the breaches of the light guide plate engaged with each other, so as to increase the contact area and enhance the accuracy of assembly.

A plurality of pins is applied to the backlight module to make the frame and the back plate assemble together. The pins are capable of fixing and positioning the light guide plate, so as to enhance the assembly structure and provide the backlight module with supporting.

Accordingly, a backlight module according to an embodiment of the present invention includes a light guide plate and a frame. A light guide plate has at least a first side and at least a second side and a chamfer formed between the border of the first side and the second side. A frame has at least a pin partially surrounds in the first side and the second side. And the chamfer of the light guide plate and the pin on the frame are engaged with each other closely.

Other advantages of the present invention will become apparent from the following description taken in conjunction with the accompanying drawings wherein are set forth, by way of illustration and example, certain embodiments of the present invention.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
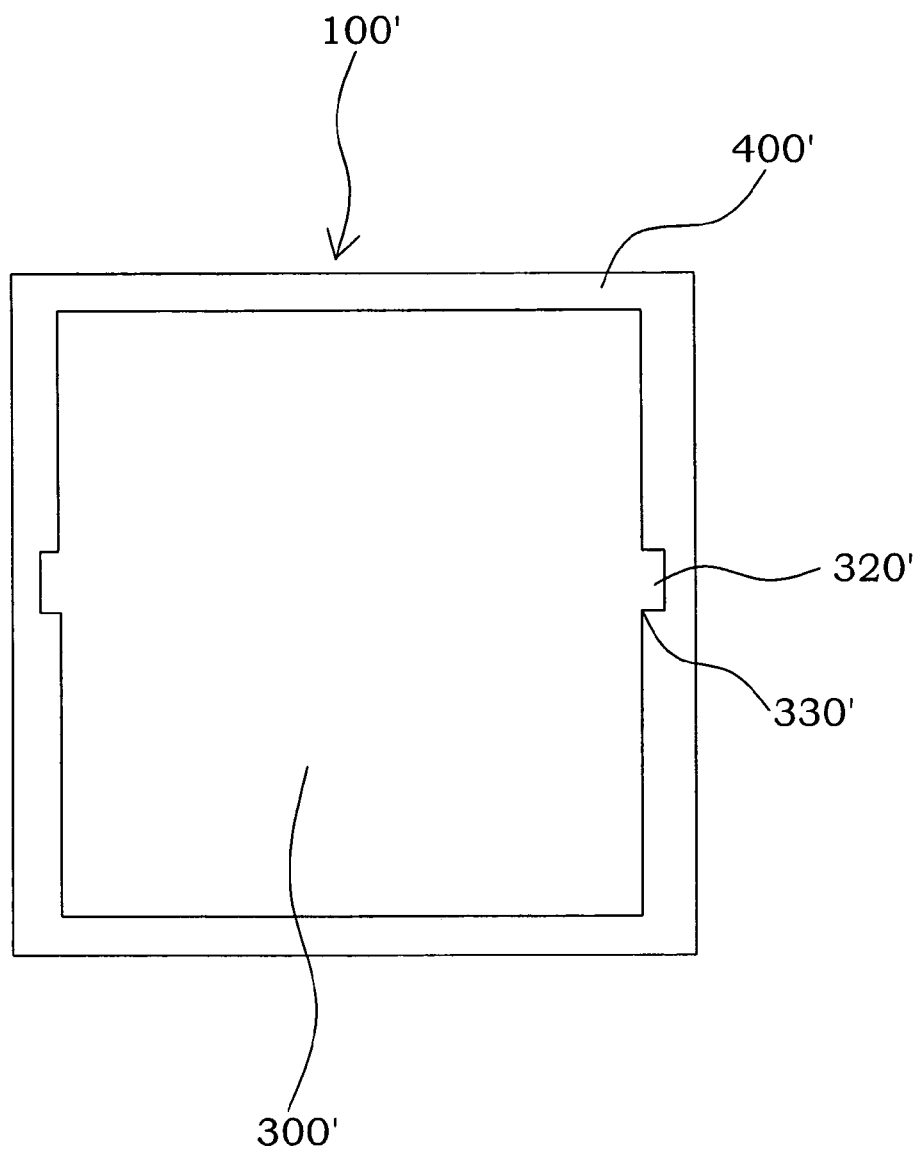
FIG. 1 is a schematic top view of the architecture of the backlight module, in accordance with the prior art.
Figure 2:
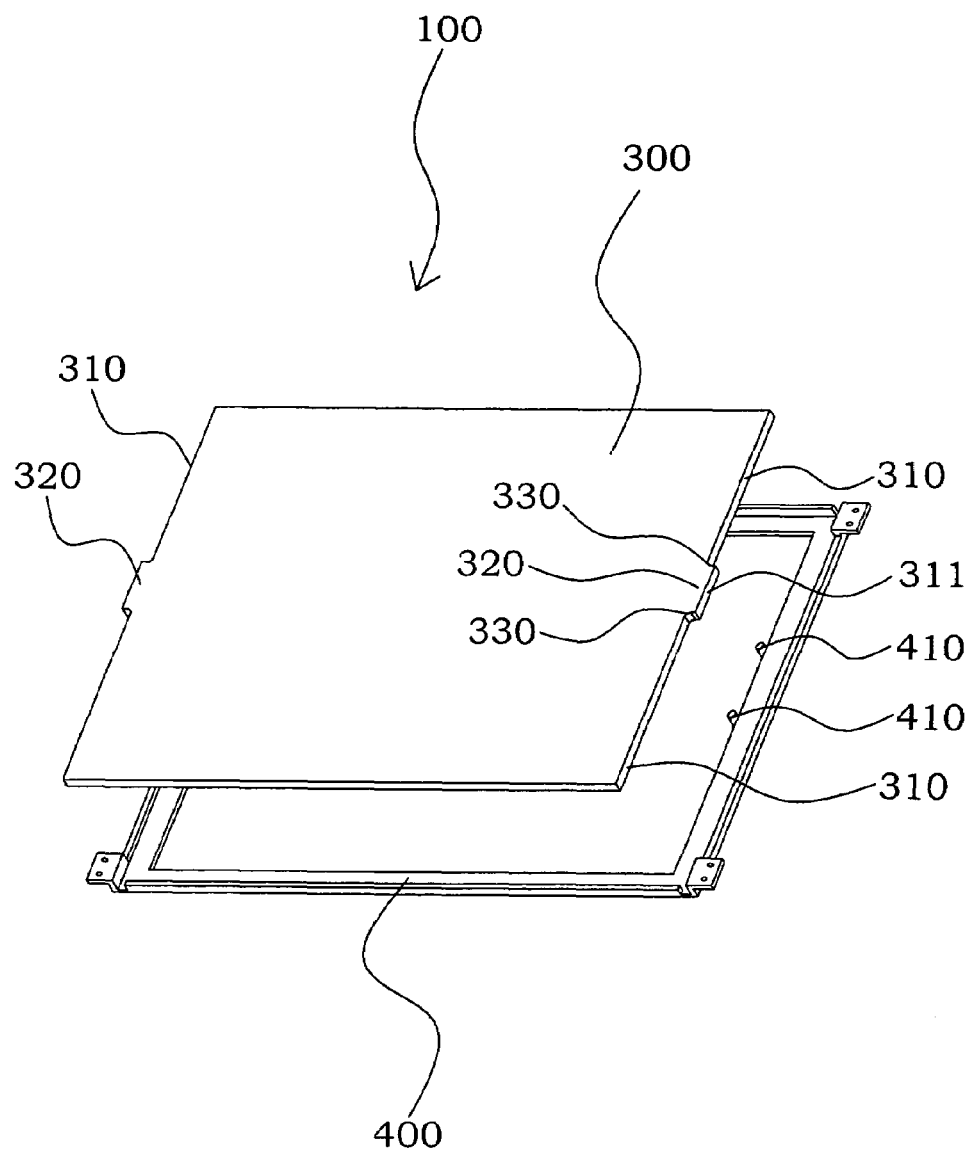
FIG. 2 is a three-dimensional view of the architecture of backlight plate of an embodiment, in accordance with the present invention.

Referring to FIG. 2 is a schematic three-dimensional view of the backlight module 100 of an embodiment in accordance with the present invention. Shown in FIG. 2, the backlight module 100 includes a light guide plate 300 and a relative frame 400. Wherein, the light guide plate 300 has at least a first side 310 and a second side 311, and a chamfer 330, for example an arc chamfer, is formed between the first side 310 and the second side 311, in one embodiment, the second side 311 and the chamfer 330 cooperate to define a bump 320 protruded from the first side 310. Moreover, a frame 400, for example a back plate, having at least a pin 410 surrounds at least the first side 310 and the second side 311 of the light guide plate 300, wherein the pin 410 may be a cylinder or an elliptic cylinder for instance. In one embodiment, the number of the pin 410 and the chamfer 330 are match, furthermore, the shape of the pin 410 is match to the shape of the chamfer 330 so as to make the pin 410 and the chamfer 330 engaged with each other closely when the light guide plate 300 is placed above the frame 400. Such the structure can increase the contact area between light guide plate 300 and the pin 410 on the frame 400, provide a supporting, and prevent the light guide plate 300 from leaking light. In one embodiment, the pin 410 fixed on the frame 400 by utilizing rivet or weld, and the pin 410, not limited to, may be a screw element, for example the screw or the column made by metal materials or even the other materials enabling to be manufactured and all should not limit the scope of the invention. Moreover, the pin 410 may be applied to screw and fix the plastic frame (not shown) and frame 402 in order to enhance the structure strength.

Figure 3:
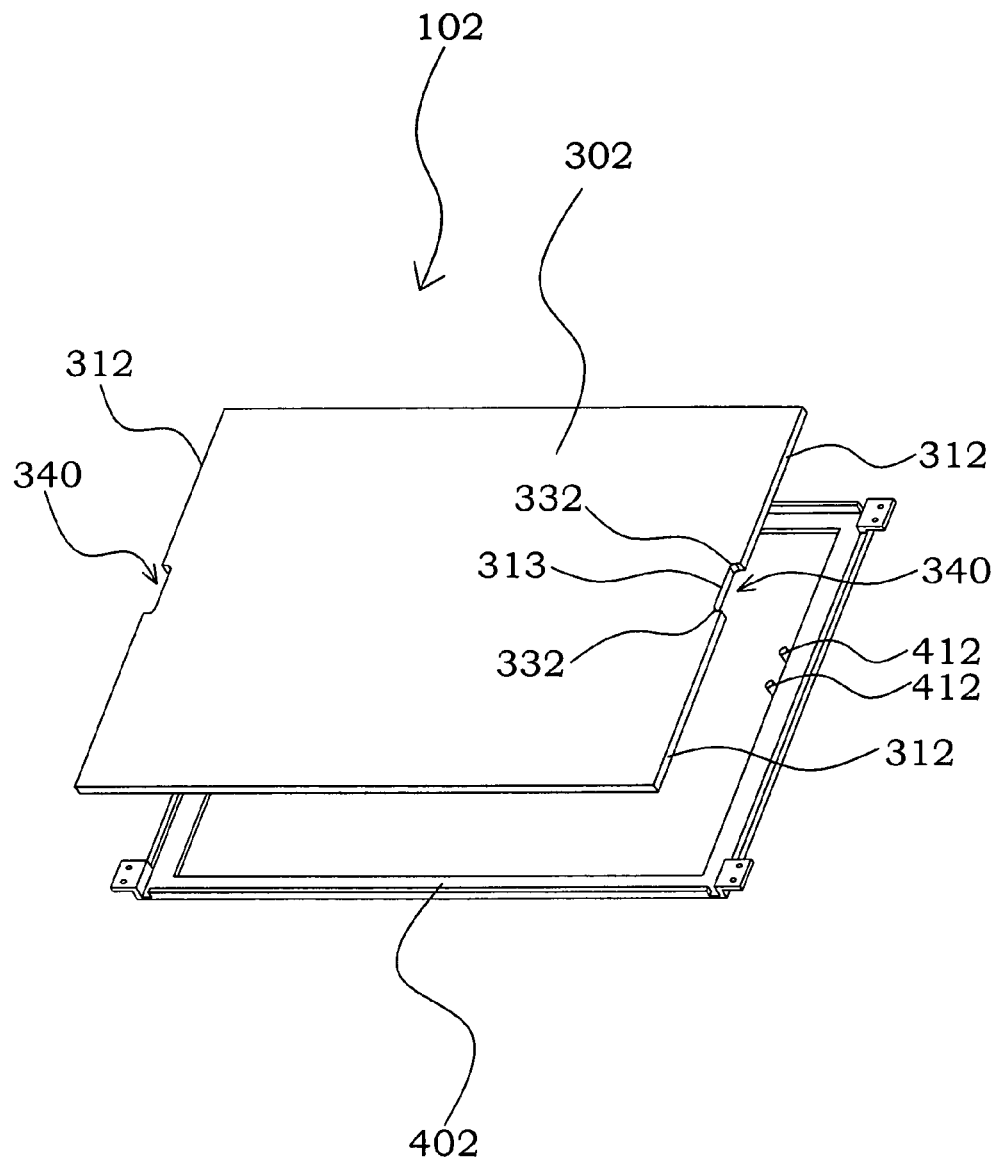
FIG. 3 is a three-dimensional view of the architecture of backlight plate of an embodiment, in accordance with the present invention.

Besides, FIG. 3 is a schematic three-dimensional view of the backlight module 102 of an embodiment in accordance with the present invention. Such as shown in the FIG. 3, the backlight module 102 includes a light guide plate 302 and a frame 402. Wherein, the light guide plate 302 has at least a first side 312 and a second side 313, and a chamfer 332, for example an arc chamfer, is formed between the first side 312 and the second side 313, in one embodiment, the second side 313 and the chamfer 332 cooperate to define a breach 340 concaved from the first side 312. In one embodiment, the breach 340 may be arranged symmetrically in the first side 312. Then a frame 402, for example a back plate, having at least a pin 412, may be any one of cylinder and elliptic cylinder for instance, surrounds at least the first side 312 and the second side 313 of the light guide plate 302. In one embodiment, the number of the pin 412 and the chamfer 332 are match, furthermore, the shape of the pin 412 is match to the shape of the chamfer 332 so as to make the pin 412 and the chamfer 332 engaged closely when the light guide plate 302 is placed above the frame 402. Such the structure can increase the contact area between light guide plate 302 and the pin 412 on the frame 402, provide a supporting, and prevent the light guide plate from leaking light. In one embodiment, the pin 412 fixed on the frame 402 by utilizing rivet or weld, and the pin 412, not limited to, may be screw element, for example the screw or the column made by metal materials or even the other materials enabling to be manufactured and all should not limit the scope of the invention. Moreover, the pin 412 may be applied to screw and fix the plastic frame (not shown) and frame 402 in order to enhance the structure strength.

Figure 4:
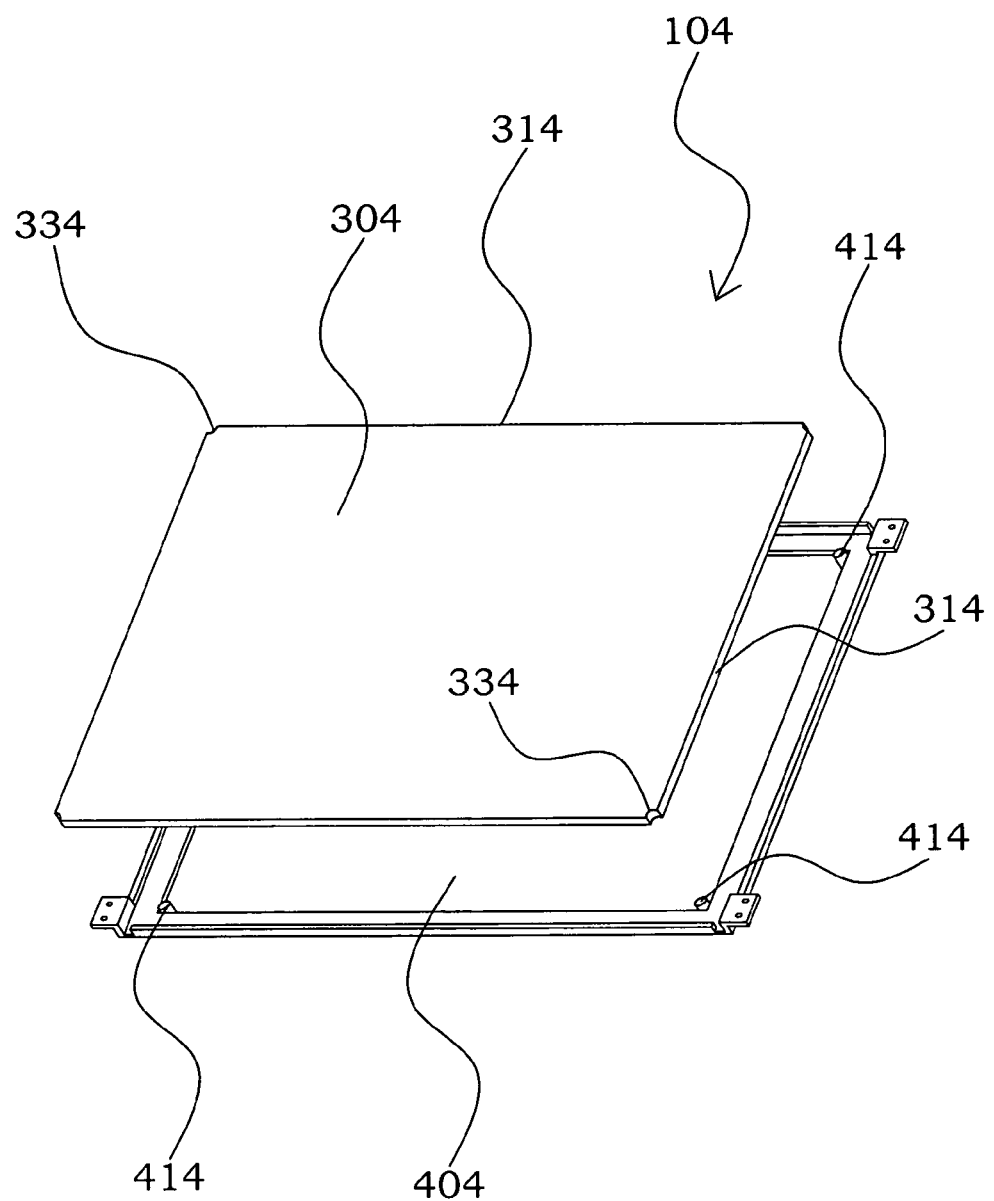
FIG. 4 is three-dimensional view of the architecture of backlight plate of an embodiment, in accordance with the present invention.

Moreover, FIG. 4 is a schematically three-dimensional view of an embodiment of the present invention, the elaboration is as follows. Refer to the FIG. 4, in the embodiment, the light guide plate 304 has at least a chamfer 334, for example an arc chamfer, in at least a side 314. In one embodiment, the chamfer 334 may be arranged symmetrically in the side 314. Furthermore, referring to FIG. 4 again, in the embodiment, a frame 404, for example a back plate, having at least a pin 414, may be any one of cylinder and elliptic cylinder for instance, surrounds the light guide plate 304. In one embodiment, the number of the pin 414 and the chamfer 334 are match, furthermore, the shape of the pin 414 is match to the shape of the chamfer 334 so as to make the pin 414 and the chamfer 334 engaged with each other closely when the light guide plate 304 is placed above the frame 404. Such the structure can increase the contact area between light guide plate 304 and the pin 414 on the frame 404, provide a supporting, and prevent the back light module from leaking light, such as shown in the FIG. 4-3. In one embodiment, the pin 414 fixed on the frame 404 by utilizing rivet or weld, and the pin 414, not limited to, may be screw element, for example the screw or the column made by metal materials or even the other materials enabling to be manufactured and all should not limit the scope of the invention. Moreover, the pin 414 may be applied to screw and fix the plastic frame (not shown) and frame 404 in order to enhance the structure strength.

Accordingly, one of features is to provide pins to keep the contact area of the light guide plate with pins on back plate be plane, so as to prevent light guide plate from leaking light. Another feature is the arc of arc chamfer of the light guide plate may vary up, just utilizes the corresponding pins to fit the arc chamfer. Furthermore, the pins can provide the support to enhance the assembly strength.

Although the present invention has been explained in relation to its preferred embodiment, it is to be understood that other modifications and variation can be made without departing the spirit and scope of the invention as hereafter claimed.

What is claimed is:

1. A backlight module comprising:
   a light guide plate having at least a first side and at least a second side, wherein a chamfer is formed between said first side and said second side; and
   a frame with at least a pin surrounding said first side and said second side of said light guide plate, wherein said chamfer of said light guide plate and said pin is on said frame and engaged with each others,
   wherein the pin is configured independently and adapted to be secured to the frame and disposed substantially perpendicular to the first side and the second side of the light guide plate, and the pin is configured with an arc shape at a certain portion thereof corresponding to and cooperating with the chamfer for deterring the light guide plate from undesired motion.

2. The backlight module according to claim 1, wherein said chamfer is an arc chamfer.

3. The backlight module according to claim 1, wherein said pin is any one of cylinder and elliptic cylinder.

4. The backlight module according to claim 1, wherein the shape of said pin is matched to the shape of said chamfer.

5. The backlight module according to claim 1, wherein said pin is arranged on said frame by utilizing rivet or weld.

6. The backlight module according to claim 1, wherein said pin is a screw element.

7. The backlight module according to claim 6, wherein any said screw element is a screw.

8. The backlight module according to claim 1, wherein said pin is made by metal material.

9. The backlight module according to claim 1, wherein said second side and said chamfer define a bump protruded from said first side.

10. The backlight module according to claim 1, wherein said second side and said chamfer define a breach concaved from said first side.

* * * * *